United States Patent
Keen et al.

(10) Patent No.: US 12,372,977 B2
(45) Date of Patent: Jul. 29, 2025

(54) UNMANNED AERIAL VEHICLE DEPLOYMENT PARAMETER MODIFICATION

(71) Applicant: International Business Machines Corporation, Armonk, NY (US)

(72) Inventors: Martin G. Keen, Cary, NC (US); Jana H. Jenkins, Raleigh, NC (US); Xin Wang, Chappaqua, NY (US); Jennifer A. Mallette, Vienna, VA (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 18/084,332

(22) Filed: Dec. 19, 2022

(65) Prior Publication Data

US 2024/0201697 A1 Jun. 20, 2024

(51) Int. Cl.
*G05D 1/10* (2006.01)
*B64C 39/02* (2023.01)
*B64U 10/00* (2023.01)
*G05D 1/00* (2006.01)
*B64U 101/20* (2023.01)
*B64U 101/30* (2023.01)

(52) U.S. Cl.
CPC .......... *G05D 1/1064* (2019.05); *B64C 39/024* (2013.01); *B64U 10/00* (2023.01); *G05D 1/104* (2013.01); *B64U 2101/20* (2023.01); *B64U 2101/30* (2023.01)

(58) Field of Classification Search
CPC .... G05D 1/1064; G05D 1/104; B64C 39/024; B64U 10/00; B64U 2101/20; B64U 2101/30; B64U 2201/10
See application file for complete search history.

(56) References Cited

U.S. PATENT DOCUMENTS

| | | |
|---|---|---|
| 9,868,352 B1 | 1/2018 | Plummer et al. |
| 2014/0139655 A1 | 5/2014 | Mimar |
| 2017/0123418 A1 | 5/2017 | Erickson et al. |
| 2017/0235308 A1 | 8/2017 | Gordon et al. |
| 2018/0082682 A1 | 3/2018 | Erickson et al. |
| 2018/0268716 A1 | 9/2018 | DeLuca et al. |
| 2018/0375568 A1 * | 12/2018 | De Rosa ............ G08G 5/0034 |

(Continued)

OTHER PUBLICATIONS

Asish et al., "Deep Learning on Eye Gaze Data to Classify Student Distraction Level in an Educational VR Environment," ICAT-EGVE 2021 International Conference on Artificial Reality and Telexistence and Eurographics Symposium on Virtual Environments, 2021, pp. 37-46.

(Continued)

*Primary Examiner* — Peter D Nolan
*Assistant Examiner* — Demetra R Smith-Stewart
(74) *Attorney, Agent, or Firm* — Zilka-Kotab, P.C.

(57) ABSTRACT

A computer-implemented method, in accordance with one embodiment, includes obtaining observational data from an unmanned aerial vehicle (UAV) deployed in a working environment, the working environment including a plurality of entities carrying out tasks within the working environment. The data is analyzed to detect a disruption caused by the UAV to one or more of the entities within the working environment during the deployment. A parameter of a deployment is adjusted based on the analysis of the obtained data.

19 Claims, 3 Drawing Sheets

(56) References Cited

U.S. PATENT DOCUMENTS

| | | | |
|---|---|---|---|
| 2020/0258400 A1* | 8/2020 | Yuan | G08G 5/0034 |
| 2022/0253076 A1* | 8/2022 | Cleland-Huang | G05D 1/692 |
| 2022/0399936 A1* | 12/2022 | Arksey | G08G 5/0043 |
| 2023/0078676 A1* | 3/2023 | Exner | B64C 39/024 |
| | | | 340/577 |
| 2023/0309072 A1* | 9/2023 | Tran | H04B 7/18506 |
| 2024/0161637 A1* | 5/2024 | Keen | G08G 5/0021 |

OTHER PUBLICATIONS

Razi et al., "Deep Learning Serves Traffic Safety Analysis: A Forward-looking Review," arXiv, 2022, 64 pages, retrieved from https://arxiv.org/abs/2203.10939.

Anonymous, "Method and System for Automatically Tracking Distracting Objects," Prior Art Database, Technical Disclosure No. IPCOM000256243D, Nov. 15, 2018, 3 pages.

CDC, "Robotics and Workplace Safety," CDC, The National Institute for Occupational Safety and Health (NIOSH), 2021, 2 pages, retrieved from https://www.cdc.gov/niosh/newsroom/feature/robotics-workplace-safety.html on Sep. 28, 2022.

Garrett-Glaser, B., "Amazon Seeks FAA Approval for Prime Air Drone Delivery," Avionics International, Aug. 9, 2019, 5 pages, retrieved from https://www.aviationtoday.com/2019/08/09/following-wing-ups-amazon-seeks-approval-prime-air-drone-delivery/.

Garrett-Glaser, B., "Iris to Test Commercial Drone Sense and Avoid System in BVLOS First," Avionics International, Aug. 15, 2019, 5 pages, retrieved from https://www.aviationtoday.com/2019/08/15/moving-beyond-line-sight-operations-key-unmanned-potential/.

\* cited by examiner

UNMANNED AERIAL VEHICLE DEPLOYMENT PARAMETER MODIFICATION

BACKGROUND

The present invention relates to unmanned aerial vehicles (e.g., drones), and more specifically, this invention relates to methodology to detect safety issues and adjust parameters of a deployment, such as a flight path, noise level, timing, etc., in response to detecting one or more safety issues.

Drones and swarms are subject to a number of rules and regulations prescribed by the Federal Aviation Administration (FAA). Flights can be fluid and dynamic with unexpected encounters that can cause the flights to become out of compliance.

Moreover, while robots have potential benefits for safety and productivity, there are also safety concerns. Working closely with robots, such as in a warehouse or on a construction site, may pose various hazards. For example, a drone flying near a worker may pose a danger to workers due to distraction cause by the drone. Such danger may include an injury from a fall, a vehicle crash, etc.

Currently, almost all drone operations sanctioned by the FAA are prohibited from Beyond Visual Line of Sight (BVLOS) operations, and the few counterexamples require either Visual Observers (VOs) or radar, both of which are prohibitive to conducting scalable, cost-effective operations such as pipeline inspection, drone delivery, or urban air mobility.

SUMMARY

A computer-implemented method, in accordance with one embodiment, includes obtaining observational data from an unmanned aerial vehicle (UAV) deployed in a working environment, the working environment including a plurality of entities carrying out tasks within the working environment. The data is analyzed to detect a disruption caused by the UAV to one or more of the entities within the working environment during the deployment therein. A parameter of a deployment is adjusted based on the analysis of the obtained data.

A computer program product, in accordance with one embodiment, includes a computer readable storage medium having program instructions embodied therewith, the program instructions executable by a computer to cause the computer to perform the foregoing method.

A system, in accordance with one embodiment, includes a processor and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
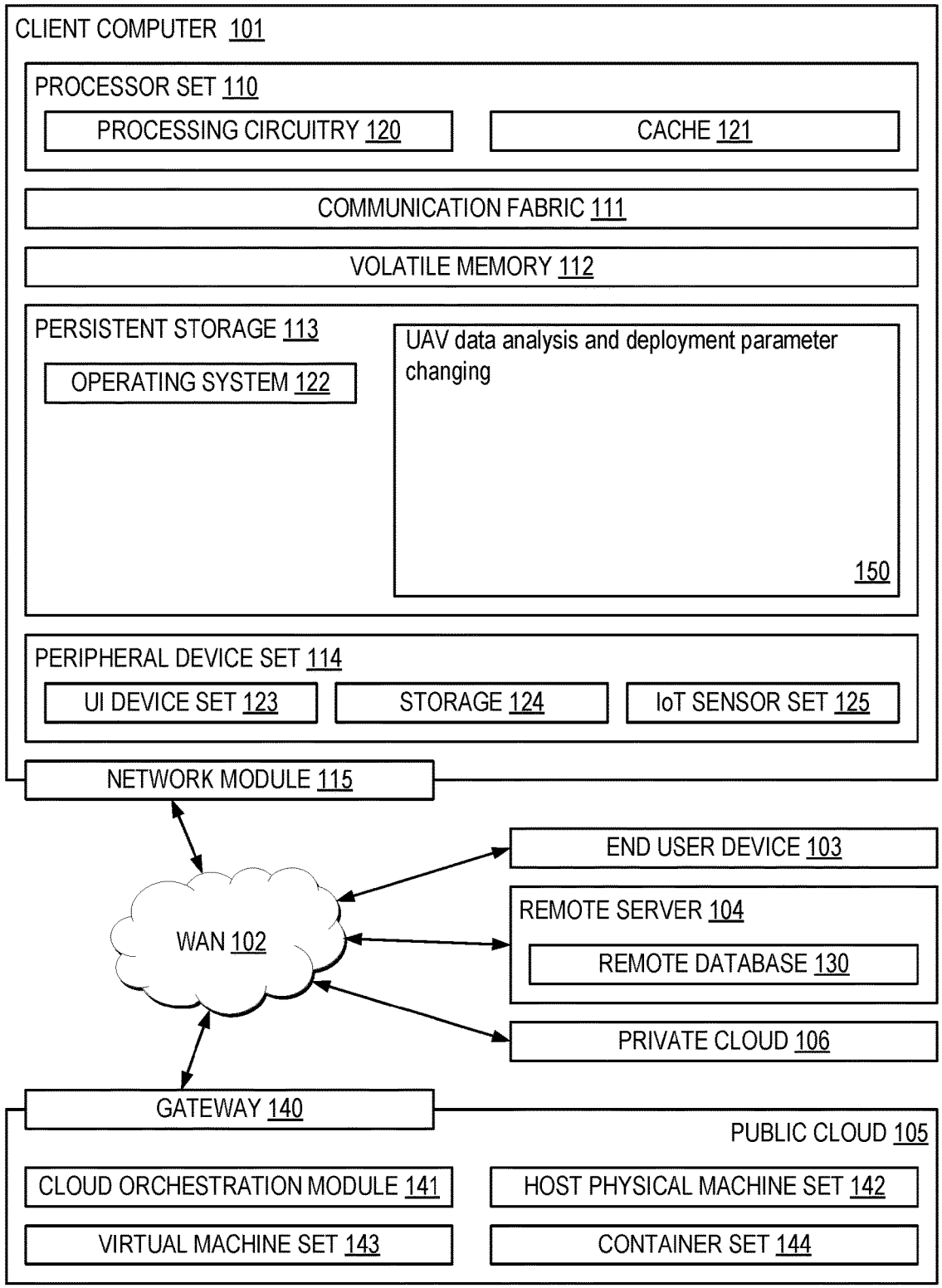
FIG. 1 is a diagram of a computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for detecting safety issues and adjusting parameters of a deployment, such as a flight path, noise level, timing, etc., in response to detecting one or more safety issues.

In one general embodiment, a computer-implemented method includes obtaining observational data from an unmanned aerial vehicle (UAV) deployed in a working environment, the working environment including a plurality of entities carrying out tasks within the working environment. The data is analyzed to detect a disruption caused by the UAV to one or more of the entities within the working environment during the deployment. A parameter of a deployment is adjusted based on the analysis of the obtained data.

In another general embodiment, a computer program product includes a computer readable storage medium having program instructions embodied therewith, the program instructions executable by a computer to cause the computer to perform the foregoing method.

In another general embodiment, a system includes a processor and logic integrated with the processor, executable by the processor, or integrated with and executable by the processor. The logic is configured to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as Unmanned Aerial Vehicle (UAV) data analysis and deployment parameter changing code in block 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system, according to various embodiments, may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

As noted above, UAVs may present a danger to entities in the area of operation of the UAV due to distraction caused by the UAV's presence. Moreover, FAA policies (rules) may specify when and how UAVs are allowed to fly.

Various embodiments presented herein enable UAVs and/or swarms of UAVs to fly within the relevant rules while attempting to avoid creating a distraction. For example, various aspects enable the ability to monitor the environment around one or more UAVs, take action based on the information gathered during the monitoring, and cause the UAV(s) to pivot and/or travel where necessary, now or in the future, to comply with policies and complete their tasks successfully.

In one approach, a UAV (or equivalently multiple UAVs) is sent out in observation mode, flying a predetermined pattern, e.g., a tentative flight path (sometimes also referred to as a flight pattern), in the vicinity of the entities UAVs might come into view of or close contact with. This can be done before a particular deployment or during a particular deployment into a working environment. Such entities may include humans; humans in or on a ground-based mode of transportation such as a vehicle, bicycle, forklift, etc.; and/or autonomous ground-based vehicles. Data is gathered and used to estimate whether the current flight path seems to be distracting the humans in any way, which may in turn identify potential safety hazards and be used to create adjustments to flight plans. For example, the data may include ambient conditions and/or UAV characteristics, such as data about the noise level of the UAV and the surrounding environment, including pitch of rotors; speed; elevation; etc. as well as machinery noise, wind noise, crowd noise and the like. Data is also used to detect any revealing behavior from nearby humans, such as looking at the UAV, pointing, quick changes in body position, etc. to indicate distraction and/or unsteadiness. The data is analyzed and may be used to make changes to the UAV and/or its flight plan, including selection of a time of day for deployment.

Accordingly, monitoring of various forms of proximity to humans and subsequent indications of safety and/or distraction from those people is enabled. Changes to flight plans may be done real-time to reduce or mitigate future distraction, or done after the flight, where changes to any number of parameters may be made, such as the UAV used, UAV characteristics, flight path, timing, etc.

Figure 2:
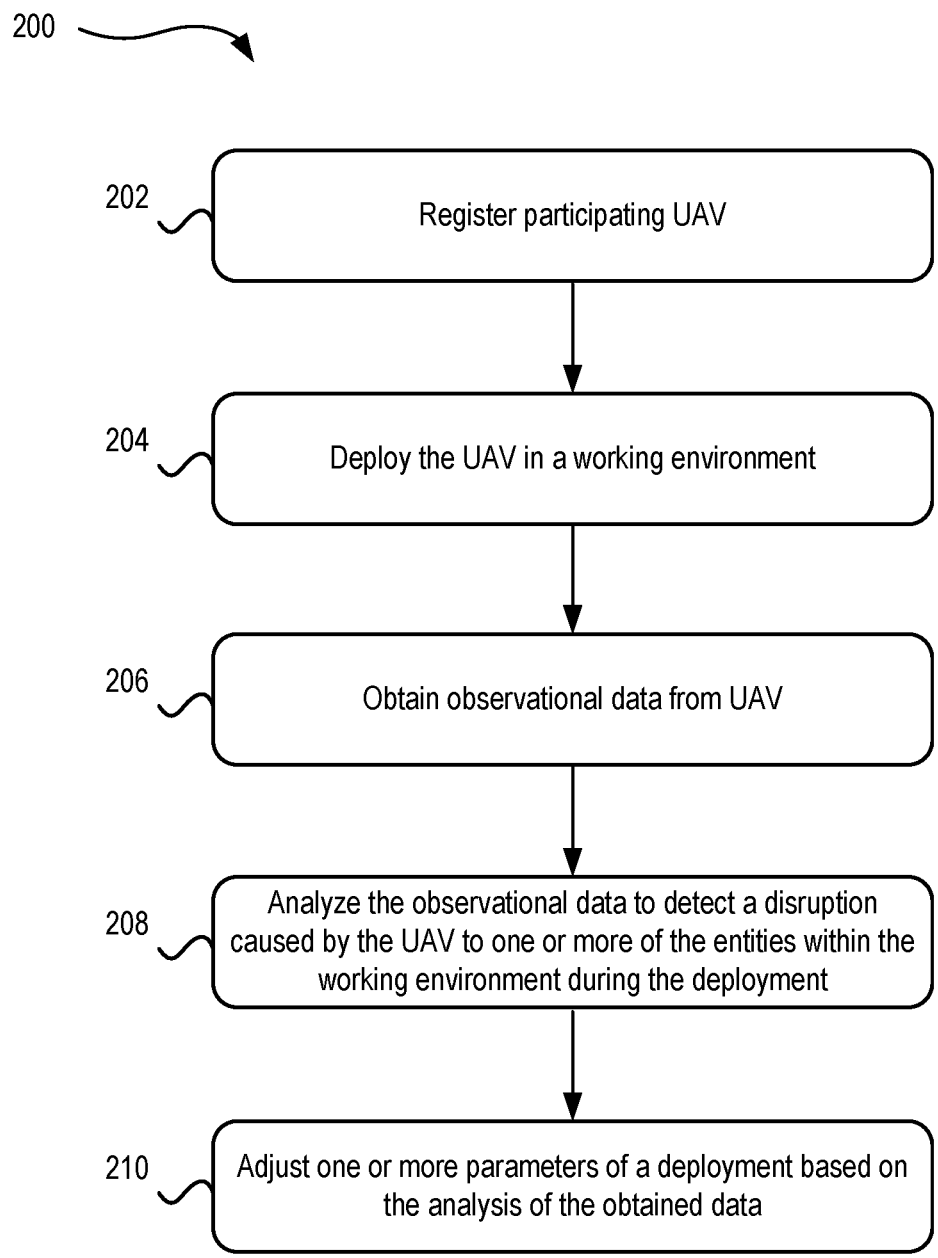
FIG. 2 is a flowchart of a method, in accordance with one embodiment of the present invention.

Now referring to FIG. 2, a flowchart of a method 200 is shown according to one embodiment. The method 200 may be performed in accordance with the present invention in any of the environments depicted in the other FIGS. herein, among others, in various embodiments. Of course, more or fewer operations than those specifically described in FIG. 2 may be included in method 200, as would be understood by one of skill in the art upon reading the present descriptions.

Each of the steps of the method 200 may be performed by any suitable component of the operating environment. For example, in various embodiments, the method 200 may be partially or entirely performed by a computer, a UAV, a computer in part and a UAV in part, or some other device having one or more processors therein. The processor, e.g., processing circuit(s), chip(s), and/or module(s) implemented in hardware and/or software, and preferably having at least one hardware component may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 2, method 200 may initiate with operation 202, in which one or more participating UAVs are registered with the inventive system. Preferably, information about the UAV that will participate in the method 200 and information about the deployment thereof, e.g., flight path, etc., are registered with the system performing the method 200.

In some approaches, UAV registration may include registration of physical characteristics of the UAV, such as UAV model, sensor capabilities, rotor type installed, dimensions, battery capacity, estimated operating range, communication capabilities, etc. Configurable settings may also be registered, such as flight speed range, maximum and minimum elevation, and data collection and/or recording options. Dynamic settings may also be registered, such as current battery level, current position, current orientation, etc. Registration may also include a statement of consent to participate in monitoring and analysis of UAV during operation thereof.

In some approaches, UAVs that will operate as part of a drone swarm can be registered as a group indicating the general swarm parameters, such as maximum number of UAVs in the swarm, maximum operating radius, etc.

In operation 204, a registered UAV (or plurality of UAVs in a swarm or traveling along diverse paths) is deployed in a working environment e.g., flying through a working environment according to a predetermined flight path, e.g., along a set of predefined waypoints. The UAV collects observational data as it moves through the working environment, e.g., via conventional sensors, cameras, microphones, etc.

The UAV is sent out along a flight path for which appropriate parameters are to be established, e.g., a further flight path for a swarm of drones delivering packages.

The working environment preferably includes a plurality of entities carrying out tasks within the working environment. Entities are generally persons and/or objects that may be distracted, affected, etc. by presence of the UAV. As noted above, such entities may include humans; humans in or on a ground-based mode of transportation such as a vehicle, bicycle, forklift, etc.; and/or autonomous vehicles, especially ground-based vehicles.

Preferably, the type of observational data collected is related to the distraction level of entities during a given deployment. The UAV may transmit the data in real time, store the data in memory thereof, etc.

Types of observational data collected may include any relevant data useful for achieving the objectives of the method 200.

Environmental observations may be collected. Exemplary environmental observations include temperature, light, wind, humidity, and other atmospheric conditions.

UAV state observations may be collected. Exemplary UAV state observations may include the current battery level, GPS coordinates, and heading of the UAV at one or more times during the deployment.

Audio recordings may be collected. These may include all sounds made by the UAV motors and rotors as well as any external sounds within earshot of the UAV microphone(s).

Video recordings may be collected. These may include some or all video footage captured by the UAV camera(s), still photos, etc. Moreover, the video data collected may be from a camera operating in the visible spectrum, a camera operating in the infrared spectrum (e.g., a thermal camera), etc. A night vision camera may be employed to gather video data in some approaches.

Any other type of data that would become apparent to one skilled in the art after reading the present disclosure may be collected.

Preferably, the data includes timestamps that correlate the data to the time the data was collected. Timestamps are particularly useful when data is being collected by multiple UAVs because the timestamps allow the data from different UAVs to be correlated. Likewise, the data may be correlated to geographic location and altitude of the UAV.

In operation 206, the observational data is obtained from the UAV(s). The data may be received in real time, downloaded after the deployment, etc. via conventional communication techniques, such as via a wireless network, a cabled connection, etc. In one approach, the observational data is received by a central computerized analysis system for further processing. In another approach, a local computer receives the observational data.

In operation 208, the observational data is analyzed to detect a disruption caused by the UAV to one or more of the entities within the working environment during the deployment. A disruption, in preferred embodiments, is any indication of distraction or discomfort to an entity reasonably considered to be occurring due to the presence of the UAV.

The analysis preferably includes parsing the data to detect patterns or the like in the data that may indicate a distracted or unsafe human environment. Several examples of preferred analysis methodology follow.

Detecting a disruption caused by the UAV may include determining that an entity has changed physical (body) and/or geographical positions in a manner likely due to the presence of the UAV, e.g., due to mobility of and/or noise emitted from the UAV. The analysis may detect sudden changes in direction and/or elevation of an entity, deeming such movement to be indicative that the UAV has come too close to the entity, causing the entity to react by moving away from the UAV. For example, if a human bends down when in proximity to the UAV, this may be indicative of the human being in fear of coming into contact with the UAV. Such movement may be detected, e.g., via the video feed.

The analysis may detect sudden changes in direction and/or elevation of the UAV, deeming such movement to be indicative that the UAV has come too close to something, and output from collision sensors of the UAV caused the UAV to take evasive action.

The analysis may detect high noise levels, e.g., higher than a predefined threshold, and determine that the UAV is too loud and causing discomfort or distraction to humans nearby. Noise is more of an issue indoors, where walls reflect the sound instead of allowing it to dissipate. Other observational data such as observation of humans looking at the UAV may be used to supplement and/or confirm this determination, e.g., if the UAV is noisy, humans will tend to look at the source of the noise.

The analysis may detect repeated instances of the same behavior by one or more entities, and determine that this is indicative that the UAV is flying in a pattern that is causing repeated distraction or discomfort to humans nearby. This type of analysis may be particularly relevant to use of UAVs in a warehouse or construction scenario, where distraction of a worker could pose a safety concern.

The analysis may detect observed human interaction indicative of distraction and/or discomfort, e.g., due to mobility of and/or noise emitted from the UAV. For example, the movement of people indicating the UAV is creating a distraction may be detected, such as by detecting a person changing a gaze direction, e.g., looking up at the UAV; pointing at the UAV, etc.

The analysis may detect an observed disruption associated with a ground-based mode of transportation. For example, detecting a disruption may include determining that an entity corresponding to a ground-based mode of transportation has reacted to presence of the UAV. Such entities may include a driver of a vehicle, a driver of a forklift, a rider of a bicycle, an autonomous vehicle, etc. For instance, sudden braking, swerving, or other evasive maneuvers is indicative that the UAV is causing a distraction or posing a potential danger to drivers or other vehicles.

Many different types of analysis may be used in operation 208, as will become apparent to one skilled in the art after reading the present disclosure. Illustrative methods to perform the analysis include visual analysis, audio analysis, and sensor analysis. The analysis may be of known type in some approaches, trained and/or modified to provide the relevant results useful for the method 200. Preferably, the analysis analyzes multiple types of data to determine a result. Moreover, the results of various sub-analyses may be weighted, e.g., visual observational data may be weighted higher than results of audio analysis. For example, a person perceived to be moving to avoid a UAV may be considered more indicative of an actual distraction than a loud whirr from the rotors.

Image analysis may be performed on the images and/or video data captured by a UAV. For example, a Convolutional Neural Network (CNN) performs object identification noting movement of people and vehicles within the video stream. The system can then identify when these objects are in close proximity to the UAV, which objects are affected by the UAV and move accordingly, etc. While CNN may be applied to all frames, a subset of the frames, such as every $30^{th}$ frame, every $60^{th}$ frame, etc. may be analyzed to reduce consumption of processing power.

In an exemplary approach, CNN is used to identify objects in a series of frames. Then, machine learning is used to characterize the significance of the information derived from the series of frames. Accordingly, in one example, CNN is used to detect and label a person in video data. The CNN may create layers of information, such as labeling a person, then labeling a head of the person, then labeling a direction of the head of the person, then labeling the direction of gaze of the person, and so on. A machine learning algorithm may be applied to characterize whether the labeled information is indicative of a disruption caused by the UAV.

Audio of an audio stream captured by a UAV may be analyzed. For example, a support vector machine (SVM) can be used to classify audio recordings as being indicative of safe or unsafe operation of the UAV based on features such as volume, pitch, and duration.

Analysis of the sensor data captured by a UAV may be performed. For example, a k-Nearest Neighbor clustering of sensor data can be used to identify when the UAV is in close proximity to people and/or objects.

Any other type of known analysis, pattern, etc. that would become apparent to one skilled in the art after reading the present disclosure may be adapted for use in operation 208.

In operation 210, one or more parameters of a deployment may be adjusted based on the analysis of the obtained data. Such adjustments may include changing a parameter, and even selecting a parameter anew. The deployment for which the parameter may be changed may be the current deployment of the UAV collecting data, a future orchestrated deployment of this or another UAV, etc. Again, the concepts described herein are also applicable to swarms of UAVs.

Illustrative parameters that may be adjusted include a present flight path of the UAV, a future flight path for the present or other UAV(s), a noise level of the UAV, a timing of a future deployment, selection of a different UAV for a future deployment (e.g., a quieter UAV, a UAV of a different color that blends in with the sky, etc.) Any other parameter, that would become apparent to one skilled in the art after reading the present disclosure, may be adjusted based on the analysis of the observational data.

In a preferred approach, the parameters are adjusted differently for different time periods, e.g., the parameters applied at one time of the day when there are many people in a location are different than the parameters applied at another time of the day when there are fewer people.

In one approach, a determination of safe and/or unsafe geographical areas for a UAV to operate may be made based on the data analysis, and parameter(s) may be adjusted in consideration thereof. For example, parameters that may be adjusted include the flight path, elevation of flight, velocity of flight (which directly affects the noise level made by the rotors and/or motor of the UAV), flight schedule, etc.

In some approaches, safe areas are preferably areas where there is no observed human and/or vehicle distraction by and/or interaction with the UAV, while unsafe areas are preferably areas where there is observed human and/or vehicle distraction by and/or interaction with the UAV. In other approaches, some level of observed human and/or vehicle distraction by and/or interaction with the UAV may be allowed before an area is deemed unsafe.

One illustrative method to identify safe and unsafe areas includes Support Vector Regression (SVR). This method can be used to identify areas where there is a high density of human and/or vehicle interaction with the UAV. These areas are preferably considered unsafe.

Another illustrative method to identify safe and unsafe areas includes K-Means Clustering. This method can be used to identify areas where there is no observed human or vehicle interaction with the UAV. These areas are preferably considered safe.

Another illustrative method to identify safe and unsafe areas includes Gaussian Process Regression (GPR). This method can be used to identify areas where there is a high density of human or vehicle interaction with the UAV. These areas are preferably considered unsafe.

Any other known method to derive safe and unsafe areas, that would become apparent to one skilled in the art after reading the present disclosure, may be adapted for use herein and used.

In some embodiments, the safe and unsafe areas can be represented as a heat map. The heat map can be used to indicate to UAV operators, flight plan coordinators, etc. where it is safe to fly and where it is not safe to fly. The heat map can also be used to determine new waypoints for the UAV to avoid unsafe areas.

Regression and clustering of known type may be adapted to determine geographical areas that are unsafe, e.g., based on the numbers of instances of something that could potentially be considered disruptive. The heat map may reflect areas where such numbers are above a predefined threshold as unsafe, and areas where said numbers are below the threshold as safe.

Based on the observed safe and unsafe areas, heat map-based modifications can be made to the current deployment, and also applied to future deployments sharing similar classifications for a UAV or UAV swarm. For example, if an unsafe area is identified near a school, the flight path for future UAV flights near that school can be modified to avoid that area.

Additionally, the heat map can be used in conjunction with historical data to predict where safe and unsafe areas will be located in the future, e.g., at some predetermined date and/or time, within a predetermined date and/or time range, etc. For example, if there is a pattern of human or vehicle interaction with UAVs at a certain time of day, the heat map can be used to indicate where and when it is safe to fly in the future. Thus, a flight path that attempts to avoid the predicted unsafe geographical areas during a future deployment may be altered and/or created.

The heat map can also be used in conjunction with a human operator. For example, the heat map may be output to a human operator for use in making decisions on where it is safe to fly UAVs, and selecting a present or future flight path for a UAV deployment.

Figure 3:
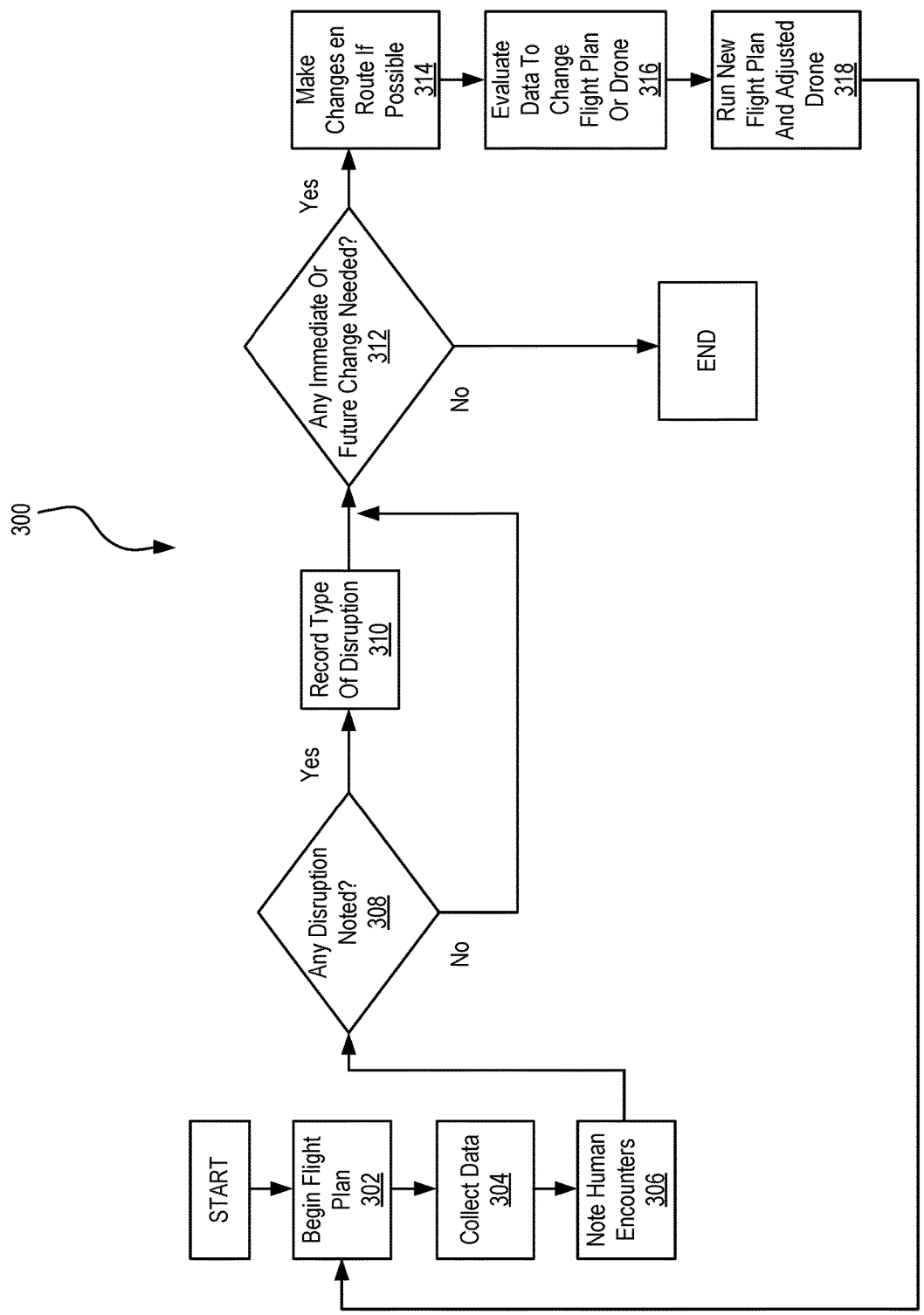
FIG. 3 is a flowchart of a method, in accordance with one embodiment of the present invention.

Now referring to FIG. 3, a flowchart of a method 300 is shown according to one embodiment. The method 300 may be performed in accordance with the present invention in any of the environments depicted in FIGS. 1-2, among others, in various embodiments. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 may initiate with operation 302, where a predefined flight plan is begun.

In operation 304, data from the UAV is collected, such as sensor data, environmental data, and other types noted elsewhere herein. For this process, 300, assume the data is received from the UAV in real time.

In operation 306, the data is analyzed to detect encounters with entities.

At decision 308, the encounters are characterized to determine if a disruption, e.g., distraction, was noted. If so, the type of disruption is recorded in operation 310.

The process then proceeds to operation 312, where a decision is made as to whether any immediate or future change in deployment parameters is needed, e.g., to avoid further disruptions. If not, the process ends. The route traveled by the UAV and the deployment parameters may be used.

If so, the process proceeds to operation 314 where changes to the flight path are made, if possible, e.g., if a better route is available. In operation 316, the data is evaluated to determine changes to deployment parameters for future deployments.

In operation 318, a new flight plan is created with the adjusted parameters. The process then returns to operation 302 to conduct another deployment.

The methodology presented herein, including the methods 200, 300 of FIGS. 2-3, may be performed according to any conceivable scenario. For example, the methodology may be performed in a reconnaissance scenario where a UAV is used to collect data just before performance of a single deployment, e.g., of a swarm of drones flying along a flight path, a sequence of drones traveling a flight path over the course of a day or some other time period, etc. In another approach, the methodology may be employed to create a flight path that will be used by UAVs for longer periods of time, e.g., days. In yet another approach, the methodology may be used to adjust parameters of a deployment in progress, where parameters are changed in real time.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
obtaining observational data from an unmanned aerial vehicle (UAV) deployed in a working environment, the working environment including a plurality of entities carrying out tasks within the working environment;
analyzing the data to detect a disruption caused by the UAV to one or more of the entities within the working environment during the deployment;
adjusting a parameter of a deployment based on the analysis of the obtained data; and
generating, based on the data, a heat map representing safe and unsafe geographical areas for the UAV to operate,
wherein the heat map is used to alter and/or create a flight path that attempts to avoid the unsafe geographical areas.

2. The computer-implemented method of claim 1, wherein the obtained data includes audio/video (A/V) data collected by the UAV, wherein the analyzing includes using image and/or audio analysis techniques to determine the disruption caused by the UAV.

3. The computer-implemented method of claim 1, wherein the obtained data includes video data collected by the UAV, wherein the analyzing includes performing an image analysis techniques with a convolutional neural network (CNN).

4. The computer-implemented method of claim 1, wherein the obtained data includes audio data collected by the UAV, wherein the analyzing includes performing an audio analysis technique with a support vector machine (SVM).

5. The computer-implemented method of claim 1, wherein detecting a disruption caused by the UAV includes determining that an entity of the plurality of entities has changed positions due to mobility of and/or noise emitted from the UAV.

6. The computer-implemented method of claim 1, wherein detecting a disruption caused by the UAV includes determining that an entity of the plurality of entities has changed a gaze direction due to mobility of and/or noise emitted from the UAV.

7. The computer-implemented method of claim 1, wherein detecting a disruption caused by the UAV includes determining that an entity corresponding to a ground-based mode of transportation has reacted to presence of the UAV.

8. The computer-implemented method of claim 1, wherein the parameter of the deployment is selected from the group consisting of a present flight path of the UAV, a future flight path, a noise level of the UAV, a timing of a future deployment, and selection of a different UAV for a future deployment.

9. The computer-implemented method of claim 1, wherein the deployment is a present deployment of the UAV.

10. The computer-implemented method of claim 1, wherein the deployment is a future deployment of the UAV.

11. The computer-implemented method of claim 1, wherein the deployment is a future deployment of a swarm of UAVs.

12. The computer-implemented method of claim 1, comprising using the heat map in conjunction with historical data to predict where unsafe geographical areas will be located in the future; and altering and/or creating a flight path for a future deployment that attempts to avoid the predicted unsafe geographical areas.

13. A computer-implemented method, comprising:
obtaining observational data from an unmanned aerial vehicle (UAV) deployed in a working environment, the working environment including a plurality of entities carrying out tasks within the working environment;
analyzing the data to detect a disruption caused by the UAV to one or more of the entities within the working environment during the deployment;
adjusting a parameter of a deployment based on the analysis of the obtained data; and
generating, based on the data, a heat map representing safe and unsafe geographical areas for the UAV to operate; and
outputting the heat map to a human operator for use in selecting a flight path for a deployment.

14. A computer program product, the computer program product comprising a computer readable storage medium having program instructions embodied therewith, the program instructions executable by a computer to cause the computer to:
obtain, by the computer, observational data from an unmanned aerial vehicle (UAV) deployed in a working environment, the working environment including a plurality of entities carrying out tasks within the working environment;
analyze, by the computer, the data to detect a disruption caused by the UAV to one or more of the entities within the working environment during the deployment;
adjusting, by the computer, a parameter of a deployment based on the analysis of the obtained data;
generating, by the computer, based on the data, a heat map representing safe and unsafe geographical areas for the UAV to operate; and using the heat map in conjunction with historical data to predict where unsafe geographical areas will be located in the future; and altering and/or creating a flight path for a future deployment that attempts to avoid the predicted unsafe geographical areas.

15. The computer program product of claim 14, wherein the obtained data includes audio/video (A/V) data collected by the UAV, wherein the analyzing includes using image and/or audio analysis techniques to determine the disruption caused by the UAV.

16. The computer program product of claim 14, wherein detecting a disruption caused by the UAV includes determining that an entity of the plurality of entities has changed positions due to mobility of and/or noise emitted from the UAV.

17. The computer program product of claim 14, wherein detecting a disruption caused by the UAV includes determining that an entity of the plurality of entities has changed a gaze direction due to mobility of and/or noise emitted from the UAV.

18. The computer program product of claim 14, wherein detecting a disruption caused by the UAV includes determining that an entity corresponding to a ground-based mode of transportation has reacted to presence of the UAV.

19. A system, comprising:
a processor; and
logic integrated with the processor, executable by the processor, or integrated with and executable by the processor, the logic being configured to cause the system to perform the method of claim 1.

* * * * *